(12) United States Patent
Baensch

(10) Patent No.: US 7,364,765 B2
(45) Date of Patent: Apr. 29, 2008

(54) PROCESS FOR DEFATTING COCONUT MEAT

(76) Inventor: Werner Baensch, Königsbergerstrasse 32, 37603 Holzminden (DE)

( * ) Notice: Subject to any disclaimer, the term of this patent is extended or adjusted under 35 U.S.C. 154(b) by 820 days.

(21) Appl. No.: 10/890,440

(22) Filed: Jul. 13, 2004

(65) Prior Publication Data

US 2005/0013909 A1    Jan. 20, 2005

(30) Foreign Application Priority Data

Jul. 18, 2003    (DE) ................ 103 32 719

(51) Int. Cl.
*A23L 1/212*    (2006.01)
(52) U.S. Cl. .............. 426/617; 426/489; 426/481; 554/8
(58) Field of Classification Search ............... None
See application file for complete search history.

(56) References Cited

U.S. PATENT DOCUMENTS

| | | | |
|---|---|---|---|
| 2,917,745 A * | 12/1959 | Kelley et al. ............ | 426/617 |
| 3,860,731 A * | 1/1975 | Forkner .................. | 426/617 |
| 3,899,606 A * | 8/1975 | Forkner .................. | 426/250 |
| 4,098,812 A * | 7/1978 | Lutz et al. .............. | 558/418 |
| 4,292,335 A * | 9/1981 | Jonsson ................. | 426/489 |
| 4,296,136 A * | 10/1981 | Ziccarelli et al. ...... | 426/533 |
| 6,447,832 B1 * | 9/2002 | Epps et al. ............. | 426/617 |

FOREIGN PATENT DOCUMENTS

| | | |
|---|---|---|
| DE | 1 047 971 | 12/1958 |
| DE | 24 22 640 | 11/1975 |
| FR | 1 564 857 | 4/1969 |
| GB | 2094334 | * 9/1982 |

OTHER PUBLICATIONS

Woodroof, J. G. 1979. Coconuts: Production, Processing, Products, 2nd edition. AVI Publishing Company, Inc., Westport, CT., p. 102-107, 208-234.*
H.-D. Belitz, W. Grosch, Lehrbuch der Lebensmittelchemie, Springer-Verlag, Berlin, Heidelberg New York, Tokyo, p. 496.

* cited by examiner

*Primary Examiner*—Carolyn Paden
(74) *Attorney, Agent, or Firm*—McGlew and Tuttle P.C.

(57) ABSTRACT

During the defatting of coconut gratings from freshly harvested coconuts, the gratings are cooled to temperatures at which crystallization, i.e., solidification of the fat components occurs, before the coconut gratings are pressed. However, this temperature must not drop below the freezing point of water, preferably <2° C., in order to avoid crystallization of the aqueous/liquid components of the coconut milk. As a result, the aqueous/liquid coconut milk with reduced fat content is separated from the coconut gratings in the next pressing. To separate the coconut oil from the coconut gratings, these are subsequently heated to temperatures at which the coconut oil becomes liquid in order to then separate it from the coconut gratings by pressing. The coconut oil (virgin coconut oil) is now obtained in an extremely efficient and gentle manner.

20 Claims, No Drawings

PROCESS FOR DEFATTING COCONUT MEAT

CROSS REFERENCE TO RELATED APPLICATIONS

This application claims the benefit of priority under 35 U.S.C. § 119 of DE 10332719.3 filed Jul. 18, 2003, the entire contents of which are incorporated herein by reference.

FIELD OF THE INVENTION

The present invention pertains to a process for defatting coconut meat.

BACKGROUND OF THE INVENTION

A process for producing coconut flakes and the products obtained therefrom is shown and described in DE 24 22 640 A1. To produce an oil cake, which is to be subjected to further processing, this process provides for coring the harvested coconut, fine grinding and pressing out the coconut meat in a suitable pressure vessel and thus separating the coconut milk from the oil cake. This oil cake is mixed with the inner fluid obtained during the drilling of the coconut and water and subjected to another pressing in order to separate more milk and a second cake.

The total coconut milk obtained from these pressings is centrifuged, and a cream and a skimmed milk are obtained. After corresponding dewatering and centrifuging, the cream yields coconut oil, which is intended for consumption.

It was found that this process is extraordinarily complicated, and it is aimed primarily at obtaining coconut flakes or powder rather than at obtaining oil.

French Patent No. 1 564 857, also describes a process for the treatment of the fresh core of the coconut, which is similar to the above-described process. The coconut milk is separated from the oil cake by pressing in this case as well, and a skimmed milk is then obtained, and the cream is subjected to further treatment in order to obtain the fresh coconut oil and a food product therefrom. Four products that are important for human nutrition are thus obtained, namely, fresh coconut oil, the concentrated coconut milk, as well as a product containing the coconut proteins, and an oil cake, whose solids are partially leached out is obtained as a byproduct for feeding animals.

This process is also very labor-intensive, and the efficiency of the production of the coconut oil is not optimal.

DE 1 047 971 B proposes a process and a device for isolating oil and fat from coconuts, in which provisions are made for heating a mixture of liquid and coconut meat gratings to a temperature of 30° C. and for obtaining a filtrate by pressing out, which said filtrate is subsequently subjected to churning. The churned filtrate is heated to separate it into protein and liquid as well as solid residues, and the protein as well as the liquid are separated by settling, and the pure oil is separated mechanically from the rest of the liquefied filtrate.

Consequently, a filtrate, which contains all the constituents, i.e., also the fat component of the coconut meat, which requires a complicated further processing to obtain the coconut oil, is obtained here in a first operation.

SUMMARY OF THE INVENTION

The basic object of the present invention is to propose an especially efficient and gentle process for removing the fat from the edible component of the coconut meat.

According to the invention, a process is provided for defatting coconut meat. The process comprises the separation of the coconut meat from the coconut shell and size reduction of the coconut meat. The temperature of the coconut gratings is set (brought) to a value below the melting point of the coconut oil contained, which is at least 20° C. and at most 28° C., preferably at 15° C., but above the freezing point of water. This is followed by a pressing (or other suitable separation) of the coconut gratings (that have been brought to the temperature range below the melting point of the coconut oil) from the coconut milk, which now has a reduced fat content. The coconut gratings obtained are heated to a temperature above the melting point of the remaining coconut oil, which is at a minimum 20° C. and which is at most 28° C. The heating is preferably to about 35° C. The separation process is repeated (or other suitable separation step i.e., centrifuge press) of the coconut gratings and separation and isolation of the coconut oil. The cellulose-containing fibers obtained from the coconut meat may then be washed and dryed.

A heat pump may be used for heating and cooling. The evaporator side of the evaporator of the heat exchanger has the temperature set for cooling in the process above and the condenser side of the condenser of the heat exchanger provides the reheating of the coconut gratings.

The pressing operations may be carried out by means of centrifuges.

The essence of the present invention is that the separation of the coconut oil from the coconut meat is brought about by the physical binding of the fat to the coconut meat, so that the fat components adhere to the coconut meat during the pressing of the coconut milk out of the coconut meat, and these fat components are then separated from the coconut meat separately in a subsequent aftertreatment operation.

The physical binding of the fat components to the coconut meat occurs due to the fact that it is set at temperatures below the state of solidification of the fat and thus transformed into the solid phase. It is important in this connection that this setting does not lead to such low temperature ranges that the water-containing components of the coconut would freeze. Separation of the fat and the milk would thus no longer be possible.

Based on this novel separation process with its extraordinarily gentle effect on the isolation of the coconut products, these products can be widely used for human nutrition, e.g., as coconut milk with reduced fat content,
coconut milk puddings,
coconut milk yogurt,
dietetic bread spreads (cheese spread),
high-fat coconut gratings,
spray-dried coconut milk with reduced fat content,
cold-pressed, native coconut oil,
cosmetic products from this oil.

These above-mentioned coconut products can be readily classified to the group of the dietetic foods, which arises from the fact that the coconut milk with reduced fat content is free from cholesterol, lactose and gluten. The above-mentioned derived products prepared from them correspondingly belong to this group of products as well.

The various features of novelty which characterize the invention are pointed out with particularity in the claims annexed to and forming a part of this disclosure. For a better understanding of the invention, its operating advantages and specific objects attained by its uses, reference is made to the accompanying descriptive matter in which preferred embodiments of the invention are described.

DESCRIPTION OF THE PREFERRED EMBODIMENTS

The production process shall be described on the basis of an example, and only the essential process steps will be described here.

In a first operation, the freshly harvested coconuts are broken open, halved and grated into fine coconut gratings by means of a grinding mill, while the temperature of these gratings rises.

In a subsequent process step, the coconut gratings are set by a continuously or intermittently operating cooling plant to a temperature below the melting point of the coconut oil, which is at least 20° C. and at most 28° C., i.e., cooled, until nearly complete crystallization of the fats contained in the coconut gratings has occurred. A temperature of 15° C. has proved to be especially effective for this purpose. This cooling process must not advance so far that the aqueous components in the coconut gratings would crystallize.

Provisions are made in the further process step for freeing the cooled coconut gratings from the coconut milk by means of a press or a centrifuge. The aqueous/liquid coconut milk with reduced fat content is thus separated from the solidified coconut oil. The coconut milk with reduced fat content, which is thus obtained and is extraordinarily rich in constituents, such as carbohydrates, protein, minerals, vitamins as well as other secondary accompanying and flavoring substances that occur in plants, in its natural composition, can be used further as a food.

The high-fat coconut gratings obtained according to the above process step are heated in another process step to a temperature above the melting point of the coconut, oil, e.g., to 35° C., as a result of which the coconut oil passes over into the liquid state.

A repeated, continuous or intermittent pressing is then performed in a next process step, and the fat components, which are to be obtained in this process in a gentle manner, are now obtained. This coconut oil can then be subjected to further processing for human nutrition because of its high purity.

The remaining filter cake obtained according to the above process step is finally freed from residues of the coconut milk and the coconut oil with water and other suitable solvents in the known manner by washing. The cellulose-containing fibers thus obtained may likewise be subjected to further use; they are free from lignin and are suitable for use, for example, as a raw material for paper-making as well as for numerous other industrial applications, including applications in food technology.

The use of a heat pump proved to be especially advantageous in the novel process, the grated coconut gratings being set to a temperature below the melting point of the coconut oil on the cold side, i.e., at the evaporator heat exchanger, and the heating of the coconut gratings after the separation of the coconut milk taking place on the warm side, i.e., at the condenser heat exchanger. The costs for the thermal processes are thus reduced to a minimum in this process, because it was found that if the output is selected properly for the amount of gratings to be processed, the heat pump reaches temperatures around 10° C. on the evaporator side at a condenser temperature of approx. 40° C., i.e., temperatures that are best suited for cooling and reheating the coconut gratings, without the introduction of additional energy.

The novel process proved to be technically so uncomplicated that it can also be readily used in the producer countries by the population living there, which is of especially great economic significance in those countries.

While specific embodiments of the invention have been shown and described in detail to illustrate the application of the principles of the invention, it will be understood that the invention may be embodied otherwise without departing from such principles.

What is claimed is:

1. A process for defatting coconut meat, the process comprising the steps of:
    separating the coconut meat from the coconut shell reducing the size of the separated coconut meat;
    setting the temperature of the separated coconut meat to a value below the melting point of the coconut oil contained in the separated coconut meat but above the freezing point of coconut milk;
    pressing the set temperature coconut meat to separate the reduced fat content coconut milk from the remaining coconut gratings;
    heating the remaining coconut gratings to a temperature above the melting point of the remaining coconut oil; and
    pressing the heated remaining coconut gratings to separate and isolate the coconut oil from remaining cellulose-containing fiber material.

2. A process according to claim 1, wherein the remaining cellulose-containing fiber 15 material from the coconut meat is washed and dried.

3. A process according to claim 1, wherein the temperature setting of the separated coconut meat is at most 28° C. and above the freezing point of water.

4. A process according to claim 3, wherein the temperature setting of the separated coconut meat is 20° C. or lower.

5. A process according to claim 4, wherein the temperature setting of the separated coconut meat is about 15° C.

6. A process according to claim 4, wherein the step of heating the remaining coconut gratings to a temperature above the melting point of the remaining coconut oil is to a temperature above 28° C.

7. A process according to claim 6, wherein the step of heating the remaining coconut gratings to a temperature above the melting point of the remaining coconut oil is to a temperature of about 35° C.

8. A process in accordance with claim 1, further comprising using a heat pump with an evaporator side setting the temperature of the separated coconut meat to a value below the melting point of the coconut oil contained in the separated coconut and the condenser side reheating of the coconut gratings in said step of heating the remaining coconut gratings to a temperature above the melting point of the remaining coconut oil.

9. A process in accordance with claim 1, wherein said pressing steps are carried out by means of centrifuges.

10. A process in accordance with claim 1, wherein said pressing steps are carried out by means of presses.

11. A coconut treatment process comprising the steps of:
    separating the coconut meat from the coconut shell;
    reducing the size of the separated coconut meat;
    cooling the separated coconut meat to a value below the melting point of the coconut oil contained in the separated coconut meat but above the freezing point of coconut milk;

pressing the cooled coconut meat to separate the reduced fat content coconut milk from the remaining coconut gratings;

heating the remaining coconut gratings to a temperature above the melting point of the remaining coconut oil; and pressing the heated remaining coconut gratings to separate and isolate the coconut oil from remaining cellulose-containing fiber material.

12. A process according to claim 11, wherein the remaining cellulose-containing fiber material from the coconut meat is washed and dried.

13. A process according to claim 11, wherein the cooling of the separated coconut meat is to a temperature of at most 28° C. and above the freezing point of water.

14. A process according to claim 13, wherein the cooling of the separated coconut meat is to a temperature of 20° C. or lower.

15. A process according to claim 14, wherein the cooling of the separated coconut meat is to a temperature of 15° C.

16. A process according to claim 14, wherein the step of heating the remaining coconut gratings to a temperature above the melting point of the remaining coconut oil is to a temperature above 28° C.

17. A process according to claim 16, wherein the step of heating the remaining coconut gratings to a temperature above the melting point of the remaining coconut oil is to a temperature of about 35° C.

18. A process in accordance with claim 11, further comprising using a heat pump with an evaporator side setting the temperature of the separated coconut meat to a value below the melting point of the coconut oil contained in the separated coconut and the condenser side reheating of the coconut gratings in said step of heating the remaining coconut gratings to a temperature above the melting point of the remaining coconut oil.

19. A process in accordance with claim 11, wherein said pressing steps are carried out by means of centrifuges.

20. A process in accordance with claim 11, wherein said pressing steps are carried out by means of presses.

* * * * *